US010338459B2

(12) United States Patent
Kobayashi et al.

(10) Patent No.: US 10,338,459 B2
(45) Date of Patent: Jul. 2, 2019

(54) LIGHT CONVERTER AND LIGHT SOURCE UNIT, AND PROJECTOR

(71) Applicant: SONY CORPORATION, Tokyo (JP)

(72) Inventors: Izushi Kobayashi, Tokyo (JP); Yuki Maeda, Kanagawa (JP); Takahiro Mochizuki, Kanagawa (JP); Mariko Obinata, Kanagawa (JP); Shinichiro Tajiri, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/569,577

(22) PCT Filed: Apr. 19, 2016

(86) PCT No.: PCT/JP2016/062308
§ 371 (c)(1),
(2) Date: Oct. 26, 2017

(87) PCT Pub. No.: WO2016/185850
PCT Pub. Date: Nov. 24, 2016

(65) Prior Publication Data
US 2018/0356715 A1    Dec. 13, 2018

(30) Foreign Application Priority Data

May 15, 2015    (JP) ................................. 2015-099924

(51) Int. Cl.
*F21S 2/00* (2016.01)
*H04N 5/74* (2006.01)
(Continued)

(52) U.S. Cl.
CPC .............. *G03B 21/204* (2013.01); *F21S 2/00* (2013.01); *F21V 29/502* (2015.01); *F21V 29/70* (2015.01);
(Continued)

(58) Field of Classification Search
CPC ....... G03B 21/204; G03B 21/16; G03B 33/12
See application file for complete search history.

(56) References Cited

U.S. PATENT DOCUMENTS

2005/0201107 A1*   9/2005   Seki ....................... G03B 21/16
                                                          362/373
2009/0219958 A1    9/2009   Mizushima et al.
(Continued)

FOREIGN PATENT DOCUMENTS

CN         101681080 A       3/2010
CN         103392093 A       11/2013
(Continued)

OTHER PUBLICATIONS

International Search Report and Written Opinion of PCT Application No. PCT/JP2016/062308, dated Jul. 19, 2016, 12 pages of ISRWO.

*Primary Examiner* — Mary Ellen Bowman
(74) *Attorney, Agent, or Firm* — Chip Law Group

(57) ABSTRACT

The invention aims to provide small-sized and highly-reliable light converter and light source unit, as well as a projector each of which makes it possible to cool down heat generated in a fluorescent body in a motorless manner. A light converter of the disclosure includes: a fluorescent body (12) that is excited by excitation light; a first light-collecting lens (11A) that has a lens surface to which the fluorescent body is bonded, and causes the excitation light to enter the fluorescent body; and a heat-dissipating member (14) to which the lens surface is adhered at least around a region to which the fluorescent body is bonded.

16 Claims, 7 Drawing Sheets

(51) Int. Cl.
*F21V 29/70* (2015.01)
*F21V 29/76* (2015.01)
*G03B 21/00* (2006.01)
*G03B 21/14* (2006.01)
*G03B 21/16* (2006.01)
*G03B 21/20* (2006.01)
*G03B 33/12* (2006.01)
*F21V 29/502* (2015.01)

(52) U.S. Cl.
CPC .............. *F21V 29/76* (2015.01); *G03B 21/00* (2013.01); *G03B 21/14* (2013.01); *G03B 21/16* (2013.01); *H04N 5/74* (2013.01); *G03B 33/12* (2013.01)

(56) References Cited

U.S. PATENT DOCUMENTS

| | | | | |
|---|---|---|---|---|
| 2012/0019788 A1* | 1/2012 | Katou | ................ | G02B 26/0833 353/33 |
| 2012/0201030 A1 | 8/2012 | Yuan et al. | | |
| 2013/0329440 A1 | 12/2013 | Tsutsumi et al. | | |
| 2014/0176915 A1* | 6/2014 | Yamamoto | ............... | H04N 9/31 353/31 |
| 2015/0205189 A1* | 7/2015 | Nojima | ................... | H01L 33/50 353/31 |

FOREIGN PATENT DOCUMENTS

| | | |
|---|---|---|
| CN | 103885275 A | 6/2014 |
| EP | 2677232 A1 | 12/2013 |
| JP | 2010-197500 A | 9/2010 |
| JP | 2012-129151 A | 7/2012 |
| JP | 2012-169189 A | 9/2012 |
| JP | 2012-185403 A | 9/2012 |
| JP | 2014-507013 A | 3/2014 |
| JP | 2014-092599 A | 5/2014 |
| JP | 2014-123014 A | 7/2014 |
| JP | 2014-165058 A | 9/2014 |
| JP | 2015-230354 A | 12/2015 |
| KR | 10-2013-0124569 A | 11/2013 |
| TW | 201245844 A | 11/2012 |
| WO | 2009/093431 A1 | 7/2009 |
| WO | 2012/109168 A1 | 8/2012 |
| WO | 2012/111292 A1 | 8/2012 |

* cited by examiner

[FIG. 1]
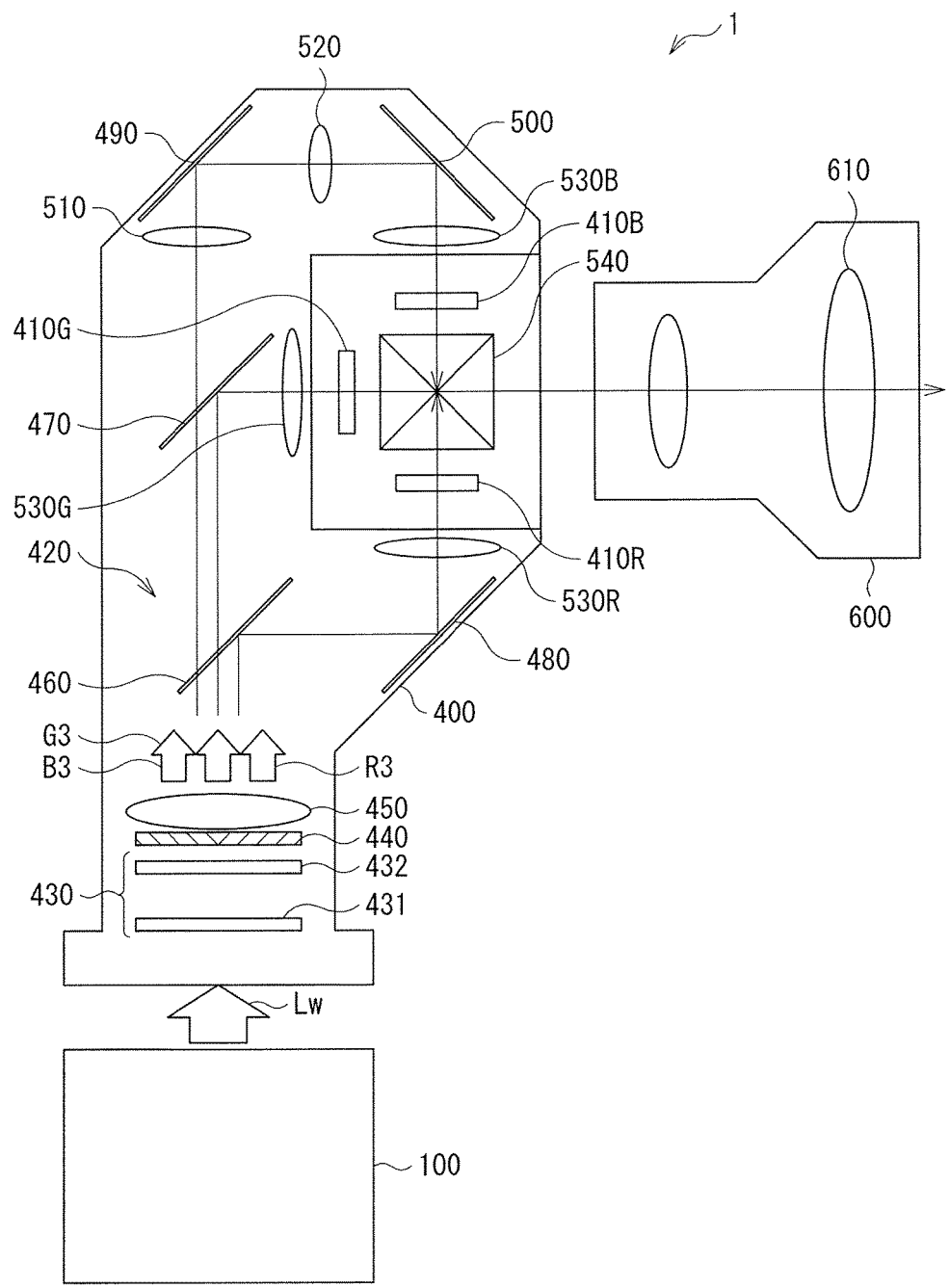

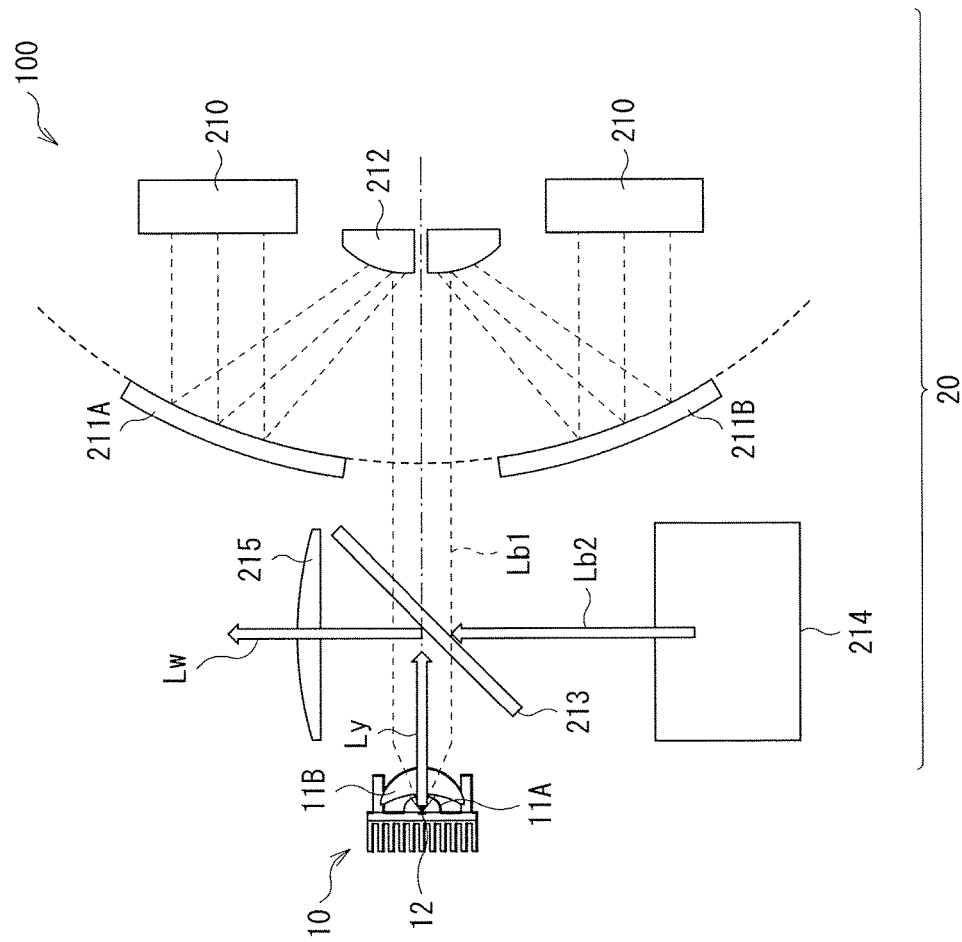
[FIG. 2]

[ FIG. 3 ]
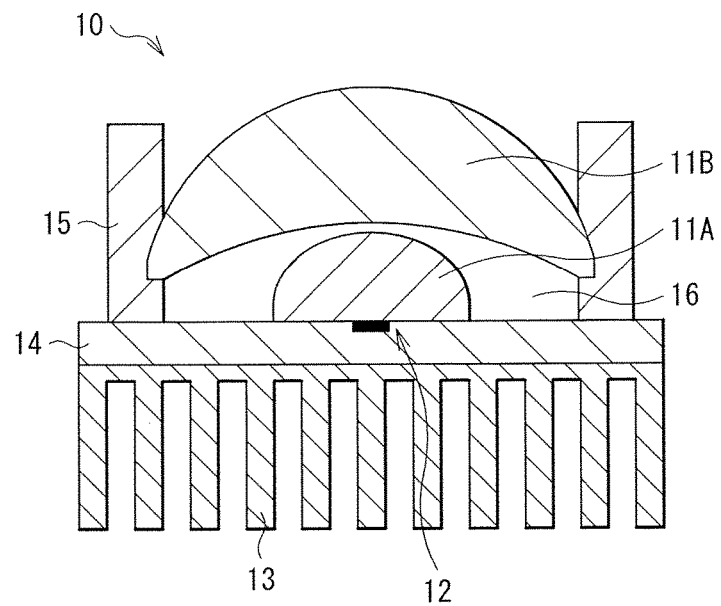
[ FIG. 4 ]
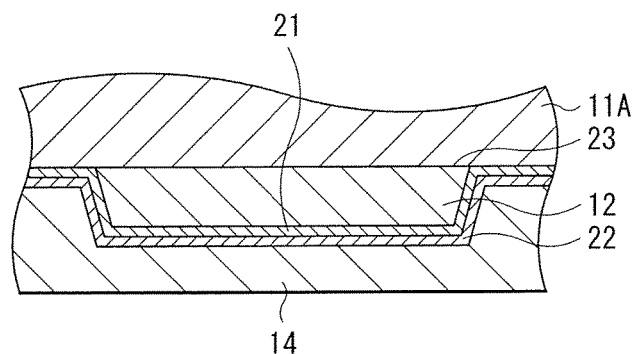

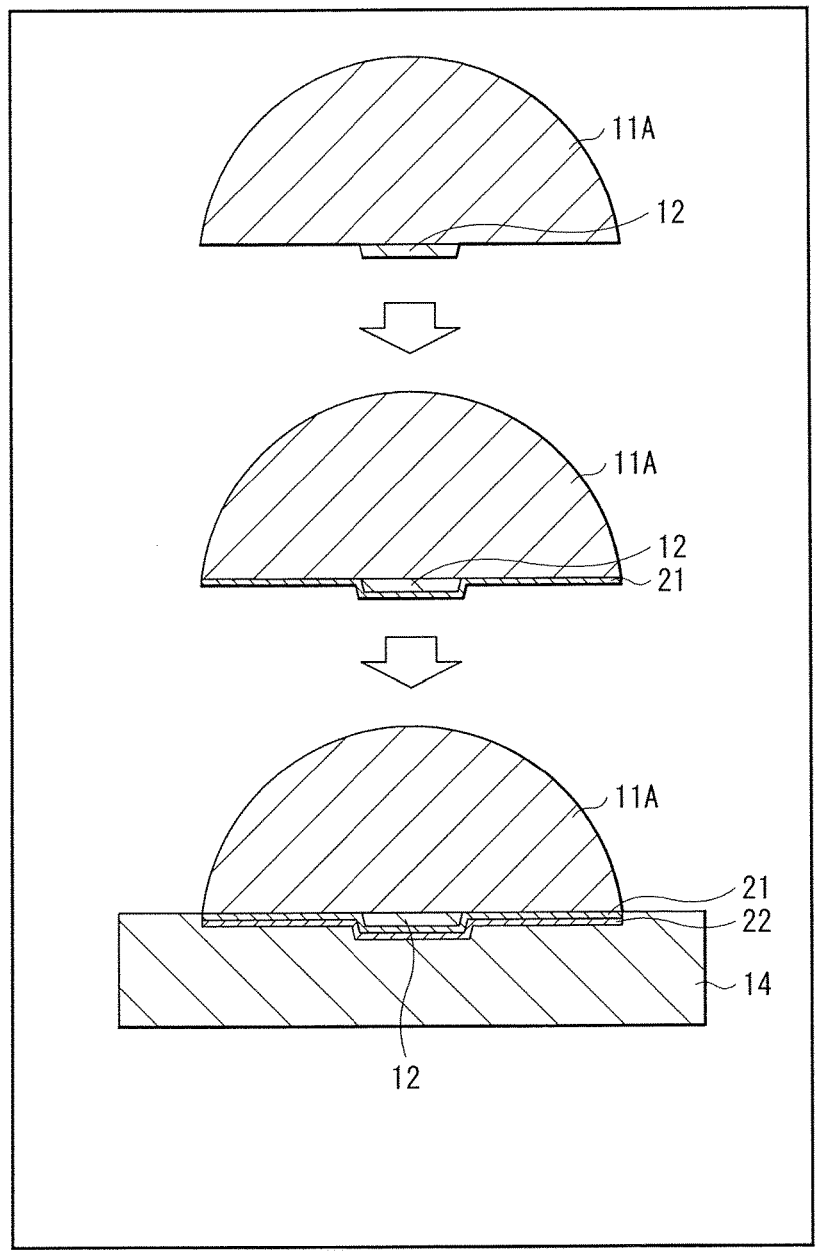
[FIG.5]

[ FIG. 6 ]
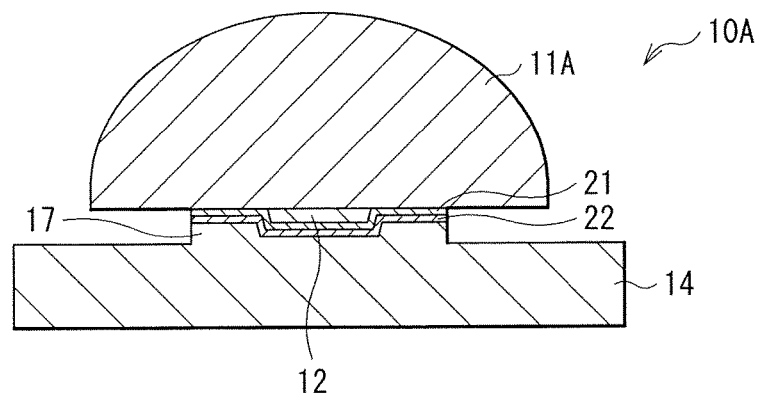
[ FIG. 7 ]
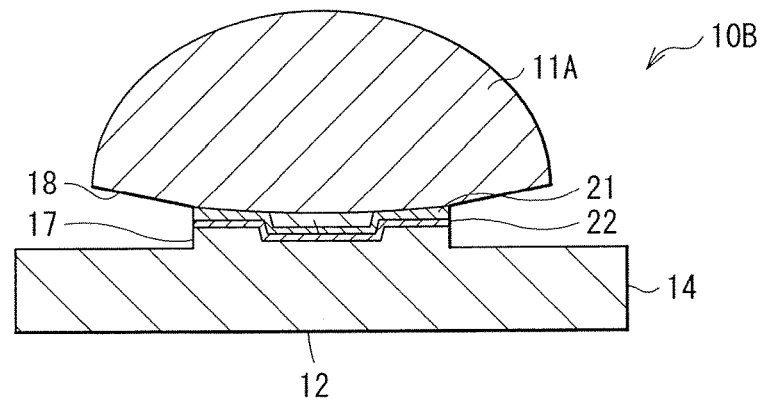
[ FIG. 8 ]
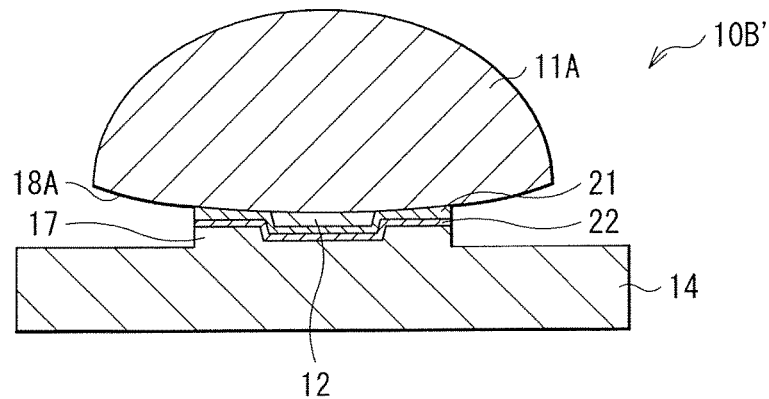

[ FIG. 9 ]
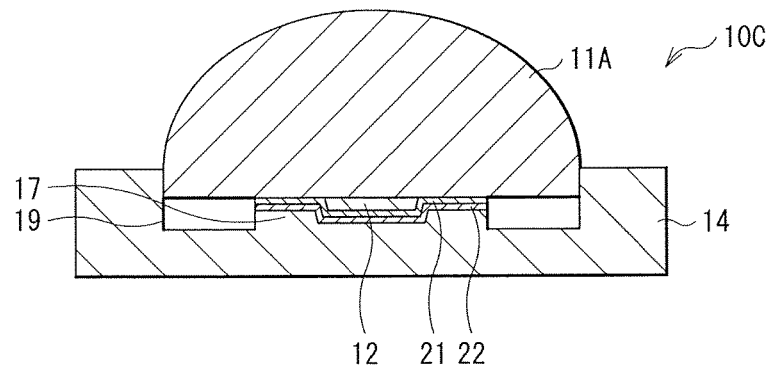
[ FIG. 10 ]
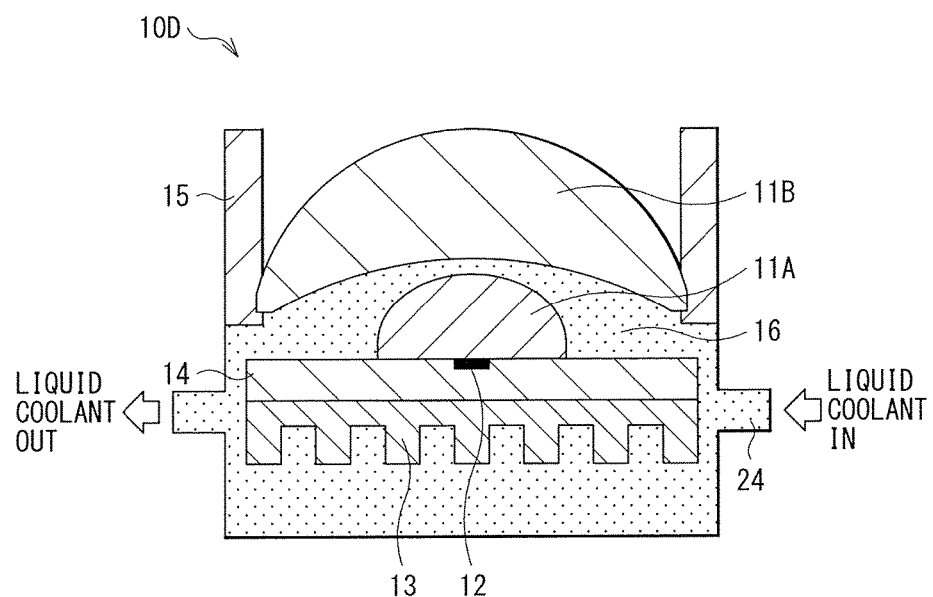

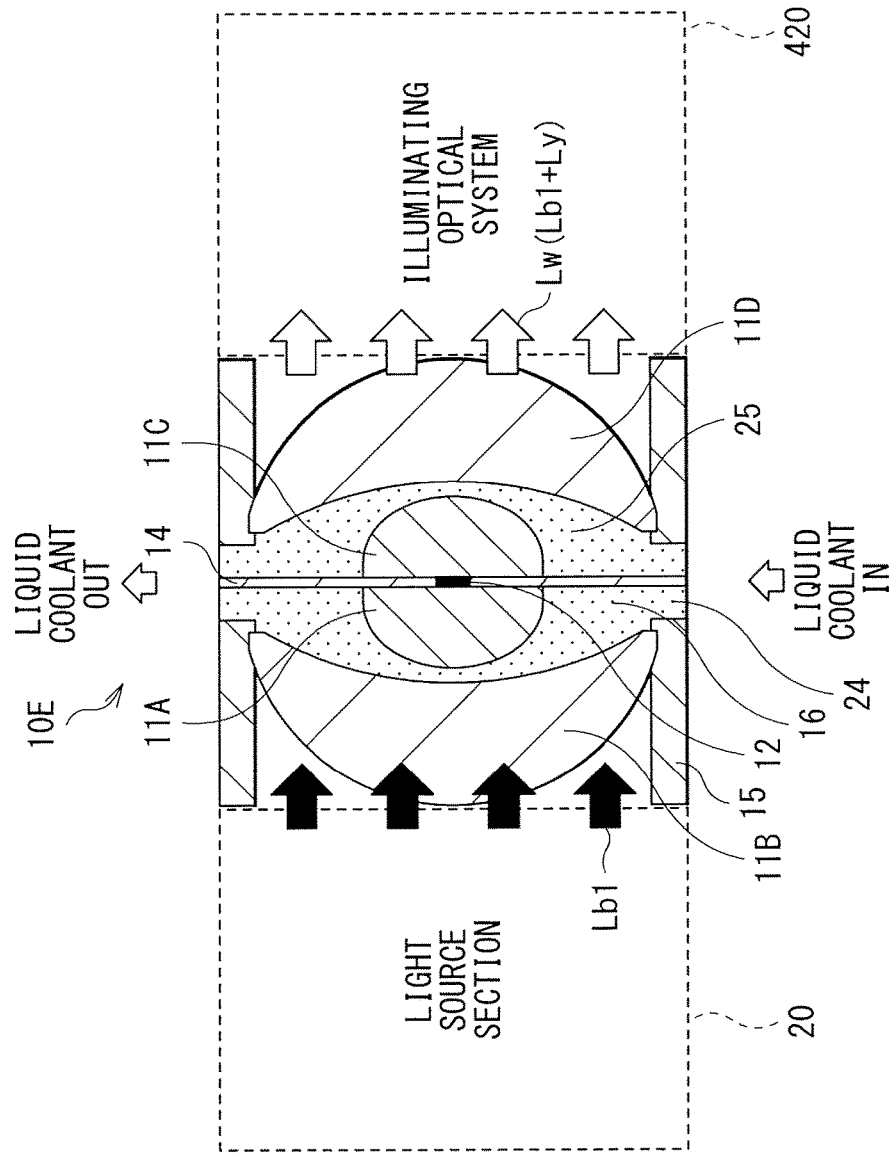
[FIG. 11]

LIGHT CONVERTER AND LIGHT SOURCE UNIT, AND PROJECTOR

CROSS REFERENCE TO RELATED APPLICATIONS

This application is a U.S. National Phase of International Patent Application No. PCT/JP2016/062308 filed on Apr. 19, 2016, which claims priority benefit of Japanese Patent Application No. JP 2015-099924 filed in the Japan Patent Office on May 15, 2015. Each of the above-referenced applications is hereby incorporated herein by reference in its entirety.

TECHNICAL FIELD

The disclosure relates to a light converter and a light source unit, as well as a projector each of which includes a fluorescent body that converts a light wavelength.

BACKGROUND ART

In recent years, a product has increased in number that adopts a solid-state light-emitting device such as a light-emitting diode (Light Emitting Diode; LED) and a laser diode (Laser Diode; LD) instead of a currently-available high-pressure mercury lamp, a xenon lamp, etc. for a light source in use for a projector, etc. for presentation or digital cinema. The solid-state light-emitting device such as the LED is more advantageous than a discharge lamp in terms of not only size and power consumption but also high reliability. In particular, to achieve further enhanced luminance and lowered power consumption, it is effective to improve the light use efficiency with use of the LD that serves as a point light source.

As a projector with use of the LD for a light source, a projector has been developed that utilizes fluorescent light generated in a manner of exciting a fluorescent body that is formed as a film on a rotating base using a laser beam emitted from the LD. In such a projector, it is necessary to suppress rise in temperature in consideration of temperature characteristics in the optical conversion efficiency of the fluorescent body, and thermal resistance of a binder, etc. for forming the fluorescent body on the base. Therefore, for example, PTL 1 discloses a projector that provides accommodation for a fluorescent wheel unit in which a fluorescent layer is formed, and a fluorescent wheel that is rotary-driven by a motor is attached, and a blower fan that blows cooling air to a light-emitting section of the fluorescent layer in a sealed container. The sealed container is provided with an air-circulating pathway in such a manner that the air from the blower fan flows through the light-emitting section of the fluorescent wheel.

Further, PTL 2 and PTL 3 propose a non-rotating method that performs heat dissipation of the fluorescent body with use of a heat sink without rotating the fluorescent wheel. For example, the PTL 2 proposes a structure in which a spacer and the fluorescent body are disposed on a substrate with the heat sink provided on a back surface thereof, and the spacer and the fluorescent body are bonded in a state of being interposed between the substrate and a light-collecting lens in a plano-convex shape that collects excitation light. Further, PTL 3 proposes a structure that seals the fluorescent body disposed on the substrate by a light-collecting lens in a meniscus shape.

CITATION LIST

Patent Literature

PTL 1: Japanese Unexamined Patent Application Publication No. 2014-92599
PTL 2: Japanese Unexamined Patent Application Publication No. 2014-165058
PTL 3: Japanese Unexamined Patent Application Publication No. 2014-123014

SUMMARY OF THE INVENTION

In the above-described method of rotating the fluorescent wheel by a motor, it may be possibly necessary to take account of generation of noise caused by rotation, and a lifetime of the motor. Further, a method in which the air intervenes between the fluorescent body and the light-collecting lens has been general; however, it is likely that such a method will necessitate a structure that performs dust-proof of cooling of the fluorescent body to avoid deterioration in the reliability due to adherence of dust. This may possibly cause an increase in the size of a cooling system.

In contrast, the non-rotating method involves fewer issues with the noise and lifetime. However, such a method makes it difficult to enhance the luminance due to more increased temperature caused by heat generation of the fluorescent body in comparison with the rotating method, a decrease in the optical conversion efficiency, and deterioration in the fluorescent body or an adhesive material. For example, in the structures described in the PTL 2 and PTL 3, an air layer is interposed between the light-collecting lens closest to the fluorescent body and the substrate at least in a peripheral region of the fluorescent body, which may possibly cause degradation in the heat dissipation capability.

It is desirable to provide a small-sized and highly-reliable light converter and light source unit, as well as a projector each of which makes it possible to cool down heat generated in the fluorescent body in a motorless manner.

A light converter according to one embodiment of the disclosure includes: a fluorescent body that is excited by excitation light; a first light-collecting lens that has a lens surface to which the fluorescent body is bonded, and causes the excitation light to enter the fluorescent body; and a heat-dissipating member to which the lens surface is adhered at least around a region to which the fluorescent body is bonded.

A light source unit according to one embodiment of the disclosure includes: a light converter; and a light source section that emits excitation light toward the light converter. The light converter includes: a fluorescent body that is excited by excitation light; a first light-collecting lens that has a lens surface to which the fluorescent body is bonded, and causes the excitation light to enter the fluorescent body; and a heat-dissipating member to which the lens surface is adhered at least around a region to which the fluorescent body is bonded.

A projector according to one embodiment of the disclosure includes: a light source unit that has a light converter, and a light source section that emits excitation light toward the light converter; and an image-generating section that generates an image on the basis of light emitted from the light source unit. The light converter includes: a fluorescent body that is excited by excitation light; a first light-collecting lens that has a lens surface to which the fluorescent body is bonded, and causes the excitation light to enter the fluorescent body; and a heat-dissipating member to which the lens surface is adhered at least around a region to which the fluorescent body is bonded.

In the light converter or the light source unit, or the projector according to the embodiment of the disclosure, the fluorescent body is bonded to the lens surface of the first light-collecting lens that causes the excitation light to enter the fluorescent body. The lens surface to which the fluorescent body is bonded is adhered to the heat-dissipating member at least around the region to which the fluorescent body is bonded.

According to the light converter or the light source unit, or the projector of the embodiment of the disclosure, the fluorescent body is bonded to the lens surface of the first light-collecting lens, and at least a peripheral region of the region to which the fluorescent body is bonded in the lens surface to which the fluorescent body is bonded is adhered to the heat-dissipating member, which makes it possible to cool down heat generated in the fluorescent body in a motorless manner, thereby allowing for reduced size and improved reliability.

It is to be noted that the effects described above are not necessarily limitative, and any of effects described in the disclosure may be provided.

BRIEF DESCRIPTION OF DRAWINGS

FIG. 1 is a configuration diagram illustrating an example of a projector according to a first embodiment of the disclosure.

FIG. 2 is a configuration diagram illustrating an example of a light source unit according to the first embodiment.

FIG. 3 is a cross-sectional view of an example of a light converter according to the first embodiment.

FIG. 4 is an enlarged cross-sectional view of a configuration example of a major part of the light converter according to the first embodiment.

FIG. 5 is a cross-sectional view of an example of a manufacturing process of the light converter according to the first embodiment.

FIG. 6 is a cross-sectional view of a first configuration example of a light converter according to a second embodiment.

FIG. 7 is a cross-sectional view of a second configuration example of the light converter according to the second embodiment.

FIG. 8 is a cross-sectional view illustrating a modification example of the second configuration example of the light converter according to the second embodiment.

FIG. 9 is a cross-sectional view of a third configuration example of the light converter according to the second embodiment.

FIG. 10 is a cross-sectional view of an example of a light converter according to a third embodiment.

FIG. 11 is a cross-sectional view of an example of a light converter according to a fourth embodiment.

MODES FOR CARRYING OUT THE INVENTION

Hereinafter, embodiments of the disclosure are described in detail with reference to the drawings. It is to be noted that the description is given in the following order.

1. First Embodiment
  1.1 Configuration
    1.1.1 Configuration Example of Projector (FIG. 1)
    1.1.2 Configuration Example of Light Source Unit (FIG. 2)
    1.1.3 Configuration Example of Light Converter (reflective light converter) (FIGS. 3 to 5)
  1.2 Workings and Effects
2. Second Embodiment (reflective light converter)
  2.1 First Configuration Example (FIG. 6)
  2.2 Second Configuration Example (FIGS. 7 and 8)
  2.3 Third Configuration Example (FIG. 9)
3. Third Embodiment (reflective and liquid-cooled light converter) (FIG. 10)
4. Fourth Embodiment (transmissive light converter) (FIG. 11)
5. Other Embodiments <1. First Embodiment>
[1.1 Configuration]
(1.1.1 Configuration Example of Projector)

FIG. 1 illustrates a configuration example of a projector according to a first embodiment of the disclosure.

A projector 1 according to the present embodiment includes a light source unit 100; an image-generating system 400 that generates an image on the basis of light emitted from the light source unit 100; and a projection optical system 600. The image-generating system 400 has an image-generating section that generates an image on the basis of applied light, and an illuminating optical system 420 that irradiates the image-generating section with the light emitted from the light source unit 100.

The image-generating section has a light valve 410R for red, a light valve 410G for green, a light valve 410B for blue, and a dichroic prism 540 that synthesizes light from each of the light valves 410R, 410G and 410B. Each of the light valves 410R, 410G and 410B includes, for example, a transmissive liquid crystal display device.

The projection optical system 600 serves to project images generated in the image-generating section on an unillustrated screen, and has a plurality of lenses 610.

The illuminating optical system 420 has an integrator device 430, a polarization converter device 440, a light-collecting lens 450, dichroic mirrors 460 and 470, mirrors 480, 490, and 500, relay lenses 510 and 520, and field lenses 530R, 530G and 530B.

The integrator device 430 includes a first fly-eye lens 431 and a second fly-eye lens 432. The first fly-eye lens 431 has, for example, a plurality of microlenses that are two-dimensionally arrayed. The second fly-eye lens 432 has, for example, a plurality of microlenses that are arrayed in a manner of corresponding to each of the microlenses of the first fly-eye lens 431.

As a whole, the integrator device 430 has a function of adjusting entrance light with which the polarization converter device 440 is irradiated by the light source unit 100 to the uniform luminance distribution. The light entering the integrator device 430 from the light source unit 100 is, for example, parallel light of white light Lw. The parallel light from the light source unit 100 is split into a plurality of bundles of ray by the plurality of microlenses of the first fly-eye lens 431. Each of the split bundles of ray is image-formed on the corresponding microlens in the second fly-eye lens 432. Each of the plurality of microlenses of the second fly-eye lens 432 functions as a secondary light source. The plurality of luminance-matched parallel light beams are emitted from the plurality of microlenses of the second fly-eye lens 432 as entrance light incoming into the polarization converter device 440.

The polarization converter device 440 has a function of matching a polarization state of entrance light incoming through the integrator device 430. The light-collecting lens 450 outputs exit light including blue light B3, green light G3, and red light R3 through the polarization converter device 440.

The dichroic mirrors 460 and 470 have properties of selectively reflecting color light at a predetermined wavelength band, and transmitting light at any other wavelength band. For example, the dichroic mirror 460 reflects the red light R3 selectively. The dichroic mirror 470 reflects the green light G3 selectively between the green light G3 and the blue light B3 that pass through the dichroic mirror 460. The remaining blue light B3 passes through the dichroic mirror 470. In such a manner, the white light Lw emitted from the light source unit 100 is separated into a plurality of color light beams of different colors.

The separated red light R3 is parallelized in a manner of being reflected by the mirror 480 to pass through the field lens 530R, and thereafter enters the light valve 410R for modulation of the red light R3. The green light G3 is parallelized in a manner of passing through the field lens 530G, and thereafter enters the light valve 410G for modulation of the green light G3. The blue light B3 passes through the relay lens 510 to be reflected by the mirror 490, and further passes through the relay lens 520 to be reflected by the mirror 500. The blue light B3 reflected by the mirror 500 is parallelized in a manner of passing through the field lens 530B, and thereafter enters the light valve 410B for modulation of the blue light B3.

Each of the light valves 410R, 410G, and 410B is electrically coupled to a signal source such as an unillustrated image reproducer that supplies an image signal including image information. Each of the light valves 410R, 410G, and 410B modulates entrance light on each pixel basis to generate an image of each color on the basis of the supplied image signal of each color. More specifically, the light valve 410R generates a red image. The light valve 410G generates a green image. The light valve 410B generates a blue image. The modulated light of each color image enters the dichroic prism 540 to be synthesized. The dichroic prism 540 synthesizes the light beams of respective color images incoming from three directions by superimposing such light to emit the resultant light toward the projection optical system 600.

The projection optical system 600 applies light of the image synthesized by the dichroic prism 540 on an unillustrated screen. In such a manner, a full-color image is displayed.

(1.1.2 Configuration Example of Light Source Unit)

FIG. 2 illustrates a configuration example of the light source unit 100.

The light source unit 100 includes a light converter 10, and a light source section 20 that emits excitation light toward the light converter 10. The light source section 20 has a light source 210, light-collecting mirrors 211A and 211B, as well as a light-collecting mirror 212, a dichroic mirror 213, a blue light source optical system 214, and a light-collecting lens 215.

As detailed later, the light converter 10 has a first light-collecting lens 11A and a second light-collecting lens 11B, as well as a fluorescent body 12 that is excited by excitation light.

The light source 210 is configured to include, for example, a blue LD that is able to oscillate blue light Lb1 having a peak wavelength of emission intensity within the wavelength range of 400 nm to 500 nm, for example. The blue light source optical system 214 is also configured to include a blue LD that is able to oscillate blue light Lb2, for example. As an alternative to the LD, any other light source such as an LED may be used for the light source 210 and the blue light source optical system 214.

The light-collecting mirrors 211A and 211B, as well as the light-collecting mirror 212 are optical systems that serve to output the blue light Lb1 emitted from the light source 210 as excitation light toward the light converter 10.

The blue light source optical system 214 outputs the blue light Lb2 to be used for generating the white light Lw in a manner of performing synthesis with yellow light Ly outgoing from the light converter 10. The dichroic mirror 213 and the light-collecting lens 215 are optical systems that generate the white light Lw by synthesizing the yellow light Ly and the blue light Lb2 to output the resultant light to the outside.

Each of the light-collecting mirrors 211A and 211B has a concave reflective surface that substantially parallelizes a bundle of ray of the blue light Lb1 emitted from the light source 210, and focuses such a bundle of ray onto the light-collecting mirror 212. The light-collecting mirror 212 reflects the blue light Lb1 focused by the light-collecting mirrors 211A and 211B toward the light converter 10.

The dichroic mirror 213 has the properties of selectively reflecting color light in a predetermined wavelength band, and transmitting light in any other wavelength band. More specifically, the dichroic mirror 213 transmits the blue light Lb1 emitted from the light source 210 and the blue light Lb2 outgoing from the blue light source optical system 214, and reflects the yellow light Ly that is subjected to optical conversion from the blue light Lb1 in the light converter 10.

The fluorescent body 12 is excited in such a manner that the fluorescent body 12 is irradiated with the blue light Lb1 passing through the dichroic mirror 213 through the first light-collecting lens 11A and the second light-collecting lens 11B in the light converter 10. The excited fluorescent body 12 converts the blue light Lb1 serving as excitation light into the yellow light Ly in a wavelength band including a wavelength band range from a red wavelength band to a green wavelength band as a fluorescent component, for example. The yellow light Ly is reflected by the dichroic mirror 213 toward the light-collecting lens 214. Further, the blue light Lb2 outgoing from the blue light source optical system 214 passes through the dichroic mirror 213 to travel toward the light-collecting lens 214. The white light Lw is generated in such a manner that the blue light Lb2 and the yellow light Ly are synthesized.

(1.1.3 Configuration Example of Light Converter)

FIG. 3 illustrates a configuration example of the light converter 10. FIG. 4 illustrates an enlarged view of a configuration example of a major part of the light converter 10.

The light converter 10 has the first light-collecting lens 11A, the second light-collecting lens 11B, the fluorescent body 12, a heat sink 13, a heat spreader 14, and a lens holder 15. Between the first light-collecting lens 11A as well as the fluorescent body 12 and the heat spreader 14, a reflective layer 21 and an adhesive layer 22 may be formed, as illustrated in FIG. 4.

In the light converter 10, the second light-collecting lens 11B and the first light-collecting lens 11A are disposed in order of entrance of excitation light. The first light-collecting lens 11A has a predetermined lens surface to which the fluorescent body 12 is bonded. The first light-collecting lens 11A focuses the excitation light incoming through the second light-collecting lens 11B onto the fluorescent body 12. Further, the first light-collecting lens 11A outputs a fluorescent component from the fluorescent body 12 toward the second light-collecting lens 11B. A lens material of the first light-collecting lens 11A desirably has a refractive index closer to that of the fluorescent body 12 to allow the fluorescent component from the fluorescent body 12 to be captured efficiently. In addition, the lens material of the first light-collecting lens 11A is desirably a material that is able to efficiently diffuse heat generated from the fluorescent body 12. For such reasons, the first light-collecting lens 11A is desirably a sapphire lens, for example.

The second light-collecting lens 11B focuses the excitation light from the light source section 20 toward the first light-collecting lens 11A. Further, the second light-collecting lens 11B focuses the fluorescent component from the fluorescent body 12 that is incoming through the first light-collecting lens 11A toward the light source section 20. The second light-collecting lens 11B is, for example, greater in an outer diameter than the first light-collecting lens 11A, and an outer circumferential portion thereof is held by the lens holder 15.

It is to be noted that FIG. 3 illustrates a configuration example of using the two light-collecting lenses. However, the configuration is not limited to such an example, and the use of the three or more light-collecting lenses may be acceptable.

All of the fluorescent body 12 and a region other than a region to which the fluorescent body 12 is bonded in the predetermined lens surface of the first light-collecting lens 11A are desirably adhered to a heat-dissipating member with a thermally-conductive layer in between. In a configuration example illustrated in FIG. 4, the reflective layer 21 is able to function as the thermally-conductive layer. Further, the heat spreader 14 is able to function as the heat-dissipating member. Further, the adhesive layer 22 may be provided between the reflective layer 21 and the heat spreader 14.

Each of the heat sink 13 and the heat spreader 14 has a function as the heat-dissipating member that diffuses heat generated in the fluorescent body 12 to lower the temperature. Further, the heat spreader 14 has a function of lowering the temperature of the first light-collecting lens 11A. The heat sink 13 is provided on a back surface of the heat spreader 14. The heat sink 13 has a function of transferring the heat diffused by the heat spreader 14 to the air for heat dissipation. Each of the heat sink 13 and the heat spreader 14 is made of a material having relatively-high thermal conductivity through a metallic or ceramic material. For example, each of the heat sink 13 and the heat spreader 14 is made of copper, aluminum, sapphire, or molybdenum.

The lens holder 15 serves to position and hold the second light-collecting lens 11B. The lens holder 15 may be integrated with the heat spreader 14.

The first light-collecting lens 11A and the second light-collecting lens 11B are disposed with spacing in between. This results in space 16 being formed between the first light-collecting lens 11A and the second light-collecting lens 11B. The space 16 is desirably of a dust-proof structure that prevents intrusion of dust from the outside. For example, a sealed structure is desirably adopted that covers a portion of a top surface of the heat spreader 14 and an outer circumferential portion of the second light-collecting lens 11B with the lens holder 15.

The fluorescent body 12 is excited by the blue light Lb1 serving as excitation light from the light source section 20 to emit light in a wavelength band that is different from a wavelength of the excitation light. The fluorescent body 12 includes, for example, a fluorescent body material that is excited by the blue light Lb1 having a center wavelength of about 445 nm to emit fluorescent light, and outputs light obtained by converting a portion of the blue light Lb1 into the yellow light Ly, as a fluorescent component. As the fluorescent body material contained in the fluorescent body 12, for example, a YAG (yttrium aluminum garnet)-based fluorescent body is used. It is to be noted that a type of the fluorescent body material, a wavelength band of light to be excited, and a wavelength band of visible light generated by excitation are not limited to those described above.

The fluorescent body 12 is a solid substance of a polycrystalline or sintered body that performs wavelength conversion of the excitation light. The fluorescent body 12 may be formed, for example, in such a manner that a substrate is coated with a powdered fluorescent body material. As an alternative, the fluorescent body 12 may be made by hardening a fluorescent body material with use of an inorganic material. Further alternatively, the fluorescent body 12 may be formed by processing the fluorescent body material with use of a crystalline material, or by sintering the fluorescent body material. As long as the fluorescent body 12 has a function of converting a wavelength of light into a wavelength other than a wavelength of the excitation light, the form thereof is not limited to any of the forms described above.

A planar size of the fluorescent body 12 may be, for example, one fifth or less of an outer diameter of the first light-collecting lens 11A. A side surface of the fluorescent body 12 may have a sloped shape, as illustrated in FIG. 4. With such a shape, as illustrated in FIG. 4, a size of the surface of the fluorescent body 12 on the side of being bonded to the first light-collecting lens 11A may be greater than a size of the surface of the fluorescent body 12 on the side of the heat spreader 14.

A junction 23 between the fluorescent body 12 and the predetermined lens surface in the first light-collecting lens 11A has a function of reducing an optical loss between the fluorescent body 12 and the first light-collecting lens 11A, and promoting heat dissipation. The fluorescent body 12 and the predetermined lens surface in the first light-collecting lens 11A are desirably bonded directly to each other with a thin film in between without having an adhesive layer between them. As a bonding method, a method of non-use of an adhesive material, such as normal-temperature bonding and optical contact, for example, is usable.

The reflective layer 21 serves to enhance the extraction efficiency of light from the fluorescent body 12. The area of the reflective layer 21 is desirably greater than the area of the fluorescent body 12. Specifically, the reflective layer 21 is desirably provided not only in a region of the fluorescent body 12, but also over a region on the outside of the fluorescent body 12. At the minimum, in such a manner that the reflective layer 21 is formed as far as a region between the fluorescent body 12 and the heat spreader 14, as well as a region around a region to which the fluorescent body 12 is bonded in the predetermined lens surface of the first light-collecting lens 11A, it is possible to reduce warming in the vicinity of the junction 23 and the heat spreader 14 due to excitation light. Further, this makes it possible to prevent light deterioration of the junction 23 that is caused by the excitation light.

FIG. 5 illustrates an example of a manufacturing process of the light converter 10.

First, as illustrated on the upper side of FIG. 5, the fluorescent body 12 is positioned and bonded at a predetermined location of the first light-collecting lens 11A, for example, at a central portion of the predetermined lens surface. For example, in a case where the first light-collecting lens 11A is configured as a lens in a plano-convex shape, a lens surface served as a planar surface is desirably used as the predetermined lens surface. As a bonding method, bonding is performed with use of, for example, the normal-temperature bonding or the optical contact.

Next, as illustrated on the middle of FIG. 5, the reflective layer 21 is formed on the surface of the fluorescent body 12, and at least around a region to which the fluorescent body 12 is bonded in the predetermined lens surface of the first light-collecting lens 11A. As the reflective layer 21, for example, an Ag film is formed with use of vapor deposition.

Thereafter, as illustrated on the lower side of FIG. 5, the first light-collecting lens 11A and the fluorescent body 12 in both of which the reflective layer 21 is formed on the surfaces thereof are adhered to the heat spreader 14 with the adhesive layer 22 in between. As the adhesive layer 22, for example, an adhesive material with high thermal conductivity, such as an Ag paste is usable.

[1.3 Workings and Effects]

As described above, according to the present embodiment, the fluorescent body 12 is bonded to the predetermined lens surface of the first light-collecting lens 11A, and all of the fluorescent body 12 and the region other than the region to which the fluorescent body 12 is bonded in the predetermined lens surface to which the fluorescent body 12 is bonded are adhered to the heat spreader 14 serving as the heat-dissipating member. This makes it possible to cool down the heat generated in the fluorescent body 12 in a motorless manner, allowing for achievement of reduced size and improved reliability.

According to the present embodiment, the fluorescent body 12 is directly bonded to the first light-collecting lens 11A that focuses excitation light, which allows the heat-dissipating performance of the fluorescent body 12 to be improved. Further, the fluorescent body 12 is directly bonded to the first light-collecting lens 11A, which makes it possible to reduce internal reflection of the light emitted from the fluorescent body 12 on an interfacial surface, and to enhance the light extraction efficiency. This makes it possible to reduce heat generation itself of the fluorescent body 12 that occurs at the time of obtaining the identical luminance.

Further, according to the present embodiment, the reflective layer 21 is provided between the first light-collecting lens 11A and the adhesive layer 22, which makes it possible to reduce rise in temperature of the fluorescent body 12, and to improve the reliability of a thermal contact layer. The first light-collecting lens 11A and the fluorescent body 12 are adhered to the heat spreader 14 with the high thermal conductivity, allowing the heat-dissipating performance to be raised.

In addition, according to the present embodiment, the fluorescent body 12 is directly bonded to the first light-collecting lens 11A that focuses the excitation light, and further a dust-proof structure is adopted for the space 16 that is interposed between the first light-collecting lens 11A and the second light-collecting lens 11B, making it possible to achieve a small-sized and highly-reliable fluorescent body cooling system.

It is to be noted that the effects described herein are merely exemplified and non-limiting, and other effects may be provided. The same is true for the following other embodiments.

<2. Second Embodiment>

Next, a description is provided of a second embodiment of the disclosure. Hereinafter, for parts having configurations and workings similar to those in the above-described first embodiment, the related descriptions are omitted as appropriate.

In the light converter 10 in the above-described first embodiment, all of the regions other than the region to which the fluorescent body 12 is bonded in the predetermined lens surface of the first light-collecting lens 11A are adhered to the heat spreader 14 serving as the heat-dissipating member. However, only a peripheral region of the region to which the fluorescent body 12 is bonded may be partially adhered to the heat spreader 14. With reference to FIGS. 6 to 9, a description is provided below of examples of such an adhesive structure.

It is to be noted that basic configurations of a projector and a light source unit according to the present embodiment may be substantially similar to those of the above-described first embodiment.

(2.1 First Configuration Example)

FIG. 6 illustrates a first configuration example of a light converter according to the second embodiment of the disclosure.

In a light converter 10A, the heat spreader 14 is provided with a stepped part 17 in a convex shape. The fluorescent body 12, and the predetermined lens surface around the region to which the fluorescent body 12 is bonded in the first light-collecting lens 11A are adhered to the stepped part 17 of the heat spreader 14 with the reflective layer 21 and the adhesive layer 22 in between. Adhesion of only the fluorescent body 12 and a peripheral region of the fluorescent body 12 to the heat spreader 14 achieves the effect of the increased reliability in a case where a difference in the coefficient of thermal expansion between the heat spreader 14 and the first light-collecting lens 11A is large.

Other configurations may be substantially similar to those of the light converter 10 according to the above-described first embodiment.

(2.2 Second Configuration Example)

FIG. 7 illustrates a second configuration example of the light converter according to the second embodiment of the disclosure. Further, FIG. 8 illustrates a modification example of the configuration example in FIG. 7.

In a light converter 10B illustrated in FIG. 7, and a light converter 10B' illustrated in FIG. 8, the heat spreader 14 is provided with the stepped part 17 in a convex shape, as with the light converter 10A described above. Further, the fluorescent body 12, and the predetermined lens surface around the region to which the fluorescent body 12 is bonded in the first light-collecting lens 11A are adhered to the stepped part 17 of the heat spreader 14 with the reflective layer 21 and the adhesive layer 22 in between.

In these light converters 10B and 10B', the first light-collecting lens 11A does not have a plano-convex shape, and the predetermined lens surface to which the fluorescent body 12 is bonded has a substantially-convex shape. A region outside a region adhered to the stepped part 17 in the predetermined lens surface of the first light-collecting lens 11A may be in a planar shape 18 that is sloped obliquely as in the light converter 10B illustrated in FIG. 7, or may be in a convex curved surface shape 18A as a whole as in the light converter 10B' illustrated in FIG. 8.

Other configurations may be substantially similar to those of the light converter 10 according to the above-described first embodiment.

(2.3 Third Configuration Example)

FIG. 9 illustrates a third configuration example of the light converter according to the second embodiment of the disclosure.

In a light converter 10C, the heat spreader 14 is provided with the stepped part 17 in a convex shape, as with the light converter 10A described above. Further, the fluorescent body 12, and the predetermined lens surface around the region to which the fluorescent body 12 is bonded in the first light-collecting lens 11A are adhered to the stepped part 17 of the heat spreader 14 with the reflective layer 21 and the adhesive layer 22 in between.

Further, in the light converter 10C, in a region on outside the stepped part 17 in the heat spreader 14, a positioning section 19 is provided that is directed to positioning of the first light-collecting lens 11A relative to the heat spreader 14. The positioning section 19 is partially in a concave shape. Thereby, the first light-collecting lens 11A is positioned, resulting in the fluorescent body 12 being positioned.

Other configurations may be substantially similar to those of the light converter 10 according to the above-described first embodiment.

<3. Third Embodiment>

Next, a description is provided of a third embodiment of the disclosure. For parts having configurations and workings similar to those in the above-described first embodiment and the above-described second embodiment, the descriptions are omitted as appropriate below.

FIG. 10 illustrates a configuration example of a light converter 10D according to the third embodiment of the disclosure.

In the light converter 10 in the above-described first embodiment, the sealed structure is adopted for the space 16 between the first light-collecting lens 11A and the second light-collecting lens 11B. In contrast, in the light converter 10D according to the present embodiment, the lens holder 15 is provided with a passage hole through which a liquid coolant 24 passes, and a structure is adopted in which the liquid coolant 24 passes through the space 16 between the first light-collecting lens 11A and the second light-collecting lens 11B. Further, a structure may be adopted in which the liquid coolant 24 passes through a portion of the heat sink 13 as well.

The liquid coolant 24 is desirably, for example, a liquid such as silicon oil that exhibits high transmittance, and has a freezing point of −20 degrees centigrade or lower. The transmittance is desirably 95% or higher for visible light, for example. As a result, the use of the liquid coolant 24 makes it possible to cool the first light-collecting lens 11A and the heat spreader 14 more efficiently in a space-saving manner, as compared with an air-cooling method.

Other configurations may be substantially similar to those of the light converter 10 according to the above-described first embodiment. Further, basic configurations of a projector and a light source unit according to the present embodiment may be substantially similar to those of the above-described first embodiment.

<4. Fourth Embodiment>

Next, a description is provided of a fourth embodiment of the disclosure. For parts having configurations and workings similar to those in the above-described first to third embodiments, the descriptions are omitted as appropriate below.

FIG. 11 illustrates a configuration example of a light converter 10E according to the fourth embodiment of the disclosure.

In the above-described first to third embodiments, the configuration examples of the reflective light converter are adopted that each reflect a fluorescent component emitted from the fluorescent body 12 in the opposite direction to the entrance direction of excitation light. In contrast, the light converter 10E according to the present embodiment is configured in such a manner that the fluorescent component and part of the excitation light pass through the fluorescent body 12 to be emitted out in the same direction.

The light converter 10E includes a third light-collecting lens 11C and a fourth light-collecting lens 11D in addition to the first light-collecting lens 11A and the second light-collecting lens 11B. The third light-collecting lens 11C and the fourth light-collecting lens 11D are disposed in the output direction of the fluorescent component and the excitation light. The third light-collecting lens 11C and the fourth light-collecting lens 11D are disposed with spacing in between. This results in space 25 being formed between the third light-collecting lens 11C and the fourth light-collecting lens 11D. The fourth light-collecting lens 11D is, for example, greater in an outer diameter than the third light-collecting lens 11C, and an outer circumferential portion thereof is held by the lens holder 15.

In the present embodiment, it is possible to generate the white light Lw by synthesizing the yellow light Ly that is a fluorescent component emitted from the fluorescent body 12 and the blue light Lb1 passing through the fluorescent body 12. The white light Lw is outputted to the illuminating optical system 420 in the projector 1 illustrated in FIG. 1. The third light-collecting lens 11C and the fourth light-collecting lens 11D focus and output the fluorescent component and the excitation light toward the illuminating optical system 420. In this case, the blue light Lb1 passing through the fluorescent body 12 is utilizable, which makes it possible to eliminate the blue light source optical system 214 and the dichroic mirror 213 of the light source section 20 in the configuration illustrated in FIG. 2, thereby allowing the light source section 20 to be reduced in size.

In the light converter 10E, the third light-collecting lens 11C is disposed to face the first light-collecting lens 11A with the fluorescent body 12 and the heat spreader 14 interposed between them. The fluorescent component emitted from the fluorescent body 12 and excitation light enter the third light-collecting lens 11C. The third light-collecting lens 11C has a predetermined lens surface bonded to an output surface of the fluorescent body 12. A lens material of the third light-collecting lens 11C, and a bonding method of the fluorescent body 12 in the third light-collecting lens 11C may be substantially similar to those of the first light-collecting lens 11A.

The third light-collecting lens 11C corresponds to one specific example of an "output-side lens" in the disclosure.

All of the regions other than the region to which the fluorescent body 12 is bonded in the predetermined lens surface of the first light-collecting lens 11A and the predetermined lens surface of the third light-collecting lens 11C are adhered to the heat spreader 14. It is to be noted that, between a region other than the region to which the fluorescent body 12 is bonded in the predetermined lens surface of the first light-collecting lens 11A and the heat spreader 14, a reflective layer may be provided around the fluorescent body 12. Further, a positioning section that is directed to positioning of the first light-collecting lens 11A and the third light-collecting lens 11C may be provided on the heat spreader 14.

Further, in the light converter 10E, the lens holder 15 is provided with a passage hole through which the liquid coolant 24 passes. Thereby, a structure is adopted in which the liquid coolant 24 passes through the space 16 between the first light-collecting lens 11A and the second light-collecting lens 11B, and the space 25 between the third light-collecting lens 11C and the fourth light-collecting lens 11D.

It is to be noted that other basic configurations of a projector and a light source unit according to the present embodiment may be substantially similar to those of the above-described first embodiment.

<5. Other Embodiments>

The technology of the disclosure is not limited to the descriptions of the above-described respective embodiments, but various modifications may be made.

For example, in any of the light source units 100 in the above-described first to third embodiments, the blue light source optical system 214 that emits the blue light Lb2 to be synthesized with the yellow light Ly that is a fluorescent component emitted from the fluorescent body 12 is provided in addition to the light source 210 that emits the blue light Lb1 serving as excitation light, and the white light Lw is generated by synthesizing the yellow light Ly and the blue light Lb2 from the blue light source optical system 214. However, a configuration in which the blue light source optical system 214 is not provided may be also adopted. For example, a configuration may be made in such a manner that the fluorescent component emitted from the fluorescent body 12 becomes the white light Lw, and the blue light source optical system 214 may be omitted. In such a case, for example, the blue light Lb1 serving as the excitation light may be 405 nm, and the fluorescent body 12 may be made of a material derived from mixing of a YAG-based fluorescent body and another material-based fluorescent body.

Further, the technology of the disclosure is applicable to not only the projector, but also car headlights, special illumination, etc.

For example, the technology may be also configured as follows.

(1)
A light converter including:
a fluorescent body that is excited by excitation light;
a first light-collecting lens that has a lens surface to which the fluorescent body is bonded, and causes the excitation light to enter the fluorescent body; and
a heat-dissipating member to which the lens surface is adhered at least around a region to which the fluorescent body is bonded.

(2)
The light converter according to (1), further including a reflective layer that is formed at least between the fluorescent body and the heat-dissipating member, and around a region to which the fluorescent body is bonded in the lens surface.

(3)
The light converter according to (2), further including an adhesive layer that is formed between the reflective layer and the heat-dissipating member.

(4)
The light converter according to any one of (1) to (3), in which all of the fluorescent body and a region other than a region to which the fluorescent body is bonded in the lens surface are adhered to the heat-dissipating member.

(5)
The light converter according to any one of (1) to (3), in which
the heat-dissipating member has a stepped part in a convex shape, and
the fluorescent body and the lens surface around a region to which the fluorescent body is bonded are adhered to the stepped part.

(6)
The light converter according to (5), in which a region outside a region adhered to the stepped part in the lens surface has a planar shape.

(7)
The light converter according to (5), in which a region outside a region adhered to the stepped part in the lens surface has a curved surface shape.

(8)
The light converter according to (5), in which the heat-dissipating member further has a positioning section that performs positioning of the first light-collecting lens relative to the heat-dissipating member in a region outside the stepped part.

(9)
The light converter according to any one of (1) to (8), further including
a second light-collecting lens that is greater in an outer diameter than the first light-collecting lens, and outputs the excitation light toward the first light-collecting lens; and
a lens holder that holds the second light-collecting lens.

(10)
The light converter according to (9), in which the first light-collecting lens and the second light-collecting lens are disposed with spacing in between, and space between the first light-collecting lens and the second light-collecting lens is structured to be sealed by the lens holder and the heat-dissipating member.

(11)
The light converter according to (9), in which a structure is adopted in which the first light-collecting lens and the second light-collecting lens are disposed with spacing in between, and a liquid coolant passes through space between the first light-collecting lens and the second light-collecting lens.

(12)
The light converter according to any one of (1) to (11), in which a planar size of the fluorescent body is one fifth or less of an outer diameter of the first light-collecting lens.

(13)
The light converter according to any one of (1) to (12), in which the fluorescent body and the lens surface are bonded by normal-temperature bonding or optical contact.

(14)
The light converter according to any one of (1), (8), and (10) to (13), further including an output-side lens that is disposed to face the first light-collecting lens with the fluorescent body and the heat-dissipating member interposed in between, that a fluorescent component emitted from the fluorescent body and the excitation light enter, and that has a lens surface bonded to an output surface of the fluorescent body.

(15)
The light converter according to (14), in which all of regions other than a region to which the fluorescent body is bonded in the lens surface of the first light-collecting lens and the lens surface of the output-side lens are adhered to the heat-dissipating member.

(16)
A light source unit including:
a light converter; and
a light source section that emits excitation light toward the light converter,
the light converter including
a fluorescent body that is excited by excitation light,
a first light-collecting lens that has a lens surface to which the fluorescent body is bonded, and causes the excitation light to enter the fluorescent body, and
a heat-dissipating member to which the lens surface is adhered at least around a region to which the fluorescent body is bonded.

(17)
A projector including:
a light source unit that has a light converter, and a light source section that emits excitation light toward the light converter; and
an image-generating section that generates an image on the basis of light emitted from the light source unit,
the light converter including
a fluorescent body that is excited by excitation light,
a first light-collecting lens that has a lens surface to which the fluorescent body is bonded, and causes the excitation light to enter the fluorescent body, and
a heat-dissipating member to which the lens surface is adhered at least around a region to which the fluorescent body is bonded.

This application claims the priority on the basis of Japanese Patent Application No. 2015-099924 filed on May 15, 2015 with Japan Patent Office, the entire contents of which are incorporated in this application by reference.

Those skilled in the art could assume various modifications, combinations, subcombinations, and changes in accordance with design requirements and other contributing factors. However, it is understood that they are included within a scope of the attached claims or the equivalents thereof

The invention claimed is:

1. A light converter, comprising:
a fluorescent body configured to receive excitation light, wherein the fluorescent body includes:
  a first surface;
  a second surface opposite to the first surface; and
  a side surface having a sloped shape extending from the first surface to the second surface;
a first light-collecting lens that comprises a first lens surface, wherein the first lens surface includes:
  a first region which is in contact with the first surface of the fluorescent body; and
  a second region which is a region of the first lens surface other than the first region, and
the first light-collecting lens is configured to direct the excitation light to the fluorescent body; and
a heat-dissipating member comprising:
  a third region in contact with the second region of the first lens surface; and
  a fourth region which is other than the third region which is in contact with the second region of the first lens surface and is in contact with the second surface of the fluorescent body and the side surface of the fluorescent body.

2. The light converter according to claim 1, further comprising a reflective layer between the fluorescent body and the heat-dissipating member.

3. The light converter according to claim 2, further comprising an adhesive layer between the reflective layer and the heat-dissipating member.

4. The light converter according to claim 1, wherein
the heat-dissipating member comprises a stepped part having a convex shape, and
the second surface of the fluorescent body and the second region of the first lens surface are attached to the stepped part.

5. The light converter according to claim 4, wherein
a fifth region of the first lens surface, which is outside the second region of the first lens surface attached to the stepped part, has a planar shape.

6. The light converter according to claim 4, wherein
a fifth region of the first lens surface, which is outside the second region of the first lens surface attached to the stepped part has a curved surface shape.

7. The light converter according to claim 4, wherein the heat-dissipating member further comprises a positioning section configured to position the first light-collecting lens relative to the heat-dissipating member, wherein the positioning section is in a region of the heat-dissipating member outside the stepped part.

8. The light converter according to claim 1, further comprising:
a second light-collecting lens that is greater in an outer diameter than the first light-collecting lens, wherein the second light-collecting lens is configured to output the excitation light toward the first light-collecting lens; and
a lens holder configured to hold the second light-collecting lens.

9. The light converter according to claim 8, wherein
the first light-collecting lens and the second light-collecting lens have a spacing in between, and
the space between the first light-collecting lens and the second light-collecting lens is sealed by the lens holder and the heat-dissipating member.

10. The light converter according to claim 8, wherein
the first light-collecting lens and the second light-collecting lens have spacing in between, and
a liquid coolant is passed through the space between the first light-collecting lens and the second light-collecting lens.

11. The light converter according to claim 1, wherein a planar size of the fluorescent body is less than or equal to one fifth of an outer diameter of the first light-collecting lens.

12. The light converter according to claim 1, wherein the fluorescent body is attached to the first region of the first lens surface by one of normal-temperature bonding or optical contact.

13. The light converter according to claim 1, further comprising an output-side lens that faces the first light-collecting lens, wherein
the fluorescent body and the heat-dissipating member are between the first light-collecting lens and the output-side lens,
the output-side lens is configured to:
  receive a fluorescent component emitted from the fluorescent body; and
  receive the excitation light, and
a second lens surface of the output-side lens is attached to an output surface of the fluorescent body.

14. The light converter according to claim 13, wherein
the second region of the first lens surface of the first light-collecting lens and the second lens surface of the output-side lens are attached to the heat-dissipating member.

15. A light source unit, comprising:
a light converter; and
a light source section configured to emit excitation light toward the light converter,
wherein the light converter comprises:
  a fluorescent body configured to receive the excitation light,
  wherein the fluorescent body includes:
    a first surface;
    a second surface opposite to the first surface; and
    a side surface having a sloped shape extending from the first surface to the second surface;
  a first light-collecting lens that comprises a lens surface, wherein the lens surface includes:
    a first region which is in contact with the first surface of the fluorescent body; and
    a second region which is a region of the lens surface other than the first region is, and
  the first light-collecting lens is configured to direct the excitation light to the fluorescent body; and
a heat-dissipating member comprising:
  a third region in contact with the second region of the lens surface; and
  a fourth region which is other than the third region which is in contact with the second region of the lens surface and is in contact with the second surface of the fluorescent body and the side surface of the fluorescent body.

16. A projector, comprising:
a light source unit that comprises a light converter, and
a light source section configured to emit excitation light toward the light converter; and
an image-generating section configured to generate an image based on light emitted from the light source unit,
wherein the light converter comprises:
  a fluorescent body configured to receive the excitation light,
  wherein the fluorescent body includes:
    a first surface;
    a second surface opposite to the first surface; and
    a side surface having a sloped shape extending from the first surface to the second surface;
  a first light-collecting lens that comprises a lens surface, wherein the lens surface includes:
    a first region which is in contact with the first surface of the fluorescent body; and
    a second region which is a region of the lens surface other than the first region is, and
  the first light-collecting lens is configured to direct the excitation light to the fluorescent body; and
a heat-dissipating member comprising:
  a third region in contact with the second region of the lens surface; and
  a fourth region which is other than the third region which is in contact with the second region of the lens surface and is in contact with the second surface of the fluorescent body and the side surface of the fluorescent body.

* * * * *